US010136359B2

(12) United States Patent
Hampel et al.

(10) Patent No.: US 10,136,359 B2
(45) Date of Patent: Nov. 20, 2018

(54) TRAFFIC FLOW MIGRATION IN BACKHAUL NETWORKS

(71) Applicant: QUALCOMM Incorporated, San Diego, CA (US)

(72) Inventors: Karl Georg Hampel, New York, NY (US); Vincent Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 14/952,660

(22) Filed: Nov. 25, 2015

(65) Prior Publication Data

US 2017/0006499 A1    Jan. 5, 2017

Related U.S. Application Data

(60) Provisional application No. 62/186,951, filed on Jun. 30, 2015.

(51) Int. Cl.
*H04L 12/725* (2013.01)
*H04L 12/721* (2013.01)
(Continued)

(52) U.S. Cl.
CPC ......... *H04W 28/10* (2013.01); *H04L 41/0668* (2013.01); *H04L 45/04* (2013.01);
(Continued)

(58) Field of Classification Search
CPC ........ H04L 45/22; H04L 69/40; H04W 40/02; H04W 28/10
(Continued)

(56) References Cited

U.S. PATENT DOCUMENTS

2003/0135578 A1* 7/2003 Banga .................... H04L 29/06
                                                              709/215
2004/0116140 A1   6/2004 Babbar et al.
(Continued)

FOREIGN PATENT DOCUMENTS

EP    2028768 A1    2/2009

OTHER PUBLICATIONS

International Search Report and Written Opinion—PCT/US2016/040180—ISA/EPO—dated Sep. 13, 2016.
(Continued)

*Primary Examiner* — Asad M Nawaz
*Assistant Examiner* — Jason A Harley
(74) *Attorney, Agent, or Firm* — Loza & Loza, LLP

(57) ABSTRACT

Aspects of the disclosure relate to network management and routing protocols in communication networks, including but not limited to wireless communication networks including Integrated-Access-Backhaul (IAB) nodes within an IAB network. In some examples, one or more traffic flows between an IAB node and a remote network may be migrated from a first tunnel associated with a first network routing domain to a second tunnel associated with a second routing domain in accordance with route information pertaining to each of the network routing domains. In various examples, the migration may be performed in response to a failure of a wireless link in the IAB network, while in other examples, the migration may be performed in response to congestion or overloading of an IAB node.

29 Claims, 10 Drawing Sheets

(51) Int. Cl.
  *H04W 72/04* (2009.01)
  *H04W 40/02* (2009.01)
  *H04W 28/10* (2009.01)
  *H04L 12/703* (2013.01)
  *H04L 29/14* (2006.01)
  *H04L 12/24* (2006.01)
  *H04L 12/715* (2013.01)
  *H04L 12/707* (2013.01)
  *H04W 28/08* (2009.01)
  *H04W 40/12* (2009.01)

(52) U.S. Cl.
  CPC .............. *H04L 45/28* (2013.01); *H04L 69/40* (2013.01); *H04W 40/02* (2013.01); *H04L 45/22* (2013.01); *H04W 28/08* (2013.01); *H04W 40/12* (2013.01)

(58) Field of Classification Search
  USPC ........................................................ 370/216
  See application file for complete search history.

(56) References Cited

U.S. PATENT DOCUMENTS

| | | | | |
|---|---|---|---|---|
| 2012/0307825 | A1* | 12/2012 | Hui | ....................... H04W 28/14 370/390 |
| 2013/0012251 | A1* | 1/2013 | Roddy | .................. H04W 28/08 455/509 |
| 2014/0378180 | A1* | 12/2014 | Schwent | ............. H04W 52/241 455/522 |

OTHER PUBLICATIONS

Raj., et al., "A Survey of IP and Multiprotocol Label Switching Fast Reroute Schemes", Computer Networks, Elsevier Science Publishers B.V., Amsterdam, NL, vol. 51, No. 8, Mar. 23, 2007 (Mar. 23, 2007), pp. 1882-1907, XP005936319, ISSN: 1389-1286 figure 13 points 4, 4.1.

* cited by examiner

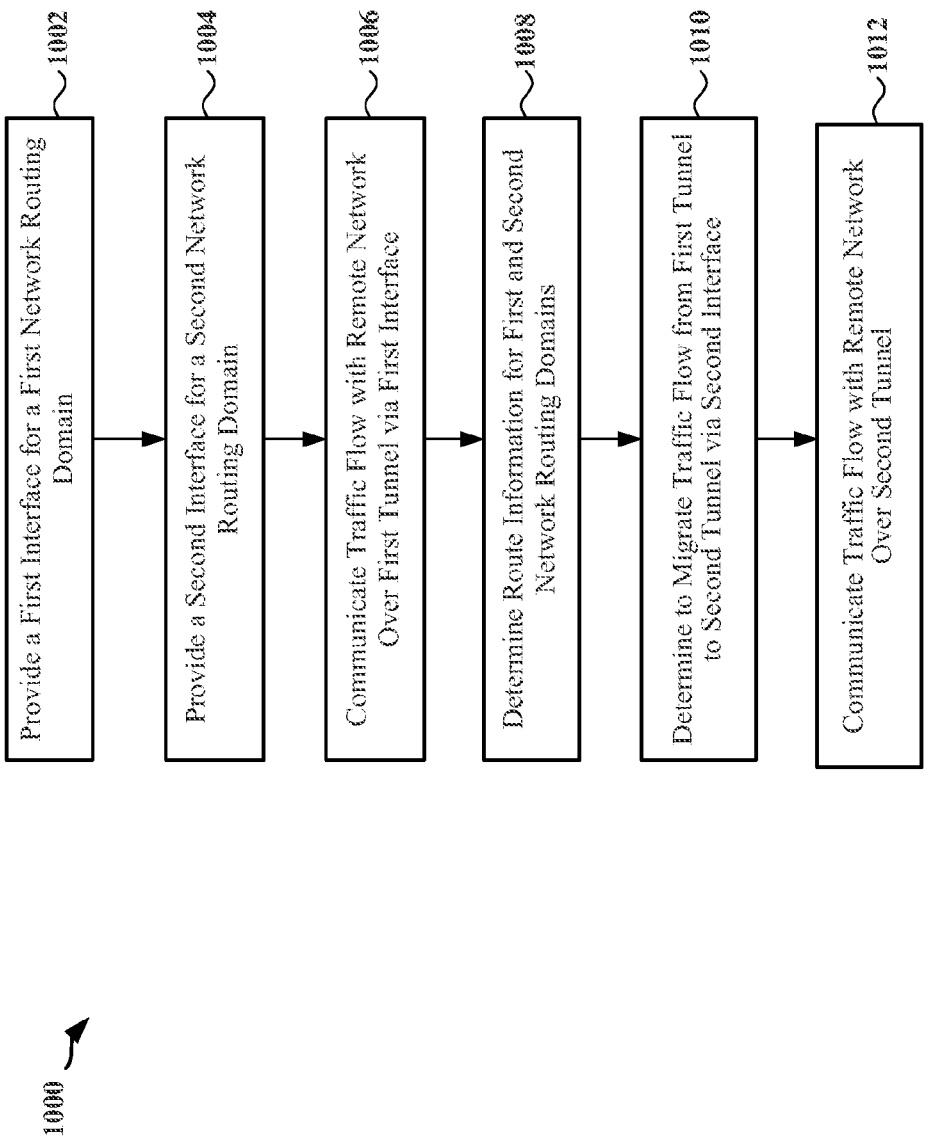

TRAFFIC FLOW MIGRATION IN BACKHAUL NETWORKS

PRIORITY CLAIM

The present application for patent claims priority to Provisional Application No. 62/186,951 entitled "Traffic Flow Migration in Backhaul Networks" filed Jun. 30, 2015, and assigned to the assignee hereof and hereby expressly incorporated by reference herein.

TECHNICAL FIELD

Aspects of the present disclosure relate generally to wireless communication systems, and more particularly, to traffic flow migration in backhaul networks for wireless communication systems.

BACKGROUND

Wireless communication networks are widely deployed to provide various communication services such as telephony, video, data, messaging, broadcasts, and so on. In a typical example, wireless communication networks provide for wireless communication between user equipment (UE), such as mobile phones, and network nodes, such as base stations, utilizing a wireless access interface. The access traffic flow (voice and/or data) communicated over the wireless access interface is further communicated between the base station and a mobile core network utilizing a suitable backhaul network, which is typically a wired network, a fiber network, a microwave network, or some combination of these.

As the demand for mobile broadband access continues to increase, research and development continue to advance the wireless technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide an Integrated-Access-Backhaul (IAB) network coupled to a remote network, such as a core network. The IAB network is formed of IAB nodes, such as base stations, that support access for user equipment (UEs) and backhaul of access traffic flows to the remote network via tunnels. In some examples, a traffic flow from an IAB node may be migrated from a first tunnel associated with a first network routing domain to a second tunnel associated with a second routing domain in accordance with routing messages on each of the network routing domains, where the routing messages provide information on the respective routes to the remote network. In various examples, this migration may be performed in response to a failure of a wireless link in the IAB network, while in other examples, the migration may be performed in response to congestion or overloading of an IAB node.

In one aspect, the disclosure provides a method operable at a network node within a wireless communication network, the method including: providing a first interface associated with a first network routing domain, in which the first interface has a first network address associated therewith, and providing a second interface associated with a second network routing domain, in which the second interface has a second network address associated therewith. The method further includes: communicating a first traffic flow with a remote network over a first tunnel between the network node and the remote network via the first interface utilizing the first network address, in which the first traffic flow includes access traffic communicated between the network node and a mobile node over a wireless communication link. The method further includes receiving, from the first network routing domain, first information relating to a first route between the network node and the remote network via the first network routing domain, receiving, from the second network routing domain, second information relating to a second route between the network node and the remote network via the second network routing domain, determining to migrate the first traffic flow from the first tunnel to a second tunnel via the second interface and the second network routing domain based on the first information and the second information, transmitting a message to a control plane node in the remote network to trigger a migration of the first traffic flow from the first tunnel to the second tunnel, and communicating the first traffic flow with the remote network utilizing the second tunnel.

Another aspect of the disclosure provides a network node within a wireless communication network. The network node includes a wireless transceiver configured to communicate a first traffic flow with a mobile node over a wireless communication link between the network node and the mobile node, a first interface associated with a first network routing domain and configured to communicate with a remote network via a first tunnel utilizing a first network address, a second interface associated with a second network routing domain and configured to communicate with the remote network via a second tunnel utilizing a second network address and at least one processor communicatively coupled to the wireless transceiver, the first interface and the second interface. The processor is further configured to communicate the first traffic flow with the remote network over the first tunnel, receive, from the first network routing domain, first information relating to a first route between the network node and the remote network via the first network routing domain, receive, from the second network routing domain, second information relating to a second route between the network node and the remote network via the second network routing domain, determine to migrate the first traffic flow from the first tunnel to the second tunnel based on the first information and the second information, transmit a message to a control plane node in the remote network to trigger a migration of the first traffic flow from the first tunnel to the second tunnel and communicate the first traffic flow with the remote network utilizing the second tunnel.

Another aspect of the disclosure provides a network node within a wireless communication network. The network node includes means for providing a first interface associated with a first network routing domain, in which the first interface has a first network address associated therewith, and means for providing a second interface associated with a second network routing domain, in which the second interface has a second network address associated therewith. The network node further includes means for communicating a first traffic flow with a remote network over a first tunnel between the network node and the remote network via the first interface utilizing the first network address, in which the first traffic flow includes access traffic communicated between the network node and a mobile node over a wireless communication link. The network node further includes means for receiving, from the first network routing domain, first information relating to a first route between the network node and the remote network via the first network routing domain, means for receiving, from the second network routing domain, second information relating to a second route between the network node and the remote network via the second network routing domain, means for determining to migrate the first traffic flow from the first tunnel to a second tunnel via the second interface and the second network routing domain based on the first information and the second information, means for transmitting a message to a control plane node in the remote network to trigger a migration of the first traffic flow from the first tunnel to the second tunnel, and means for communicating the first traffic flow with the remote network utilizing the second tunnel.

Examples of additional aspects of the disclosure follow. In some aspects, the first interface and the second interface are logical interfaces. In some aspects, third information about at least one physical link that supports the first and second logical interfaces is received and the determining to migrate the first traffic flow to the second tunnel is further based on the third information. In some aspects, the third information includes link metrics related to a physical link quality of the at least one physical link. In some aspects, the first information further includes first route metrics related to a first set of link metrics pertaining to the first route and the second information further includes second route metrics related to a second set of link metrics pertaining to the second route. In some aspects, the first route metrics include a first cost metric for the first route and the second route metrics include a second cost metric for the second route and the determining to migrate the first traffic flow to the second tunnel includes determining to migrate the first traffic flow from the first tunnel to the second tunnel when the second cost metric is less than the first cost metric.

In some aspects, the first interface and the second interface are supported by a common physical interface. In some aspects, at least one of the first interface and the second interface is supported by a wireless interface. In some aspects, the first network address includes a first network prefix associated with the first network routing domain, and the second network address includes a second network prefix associated with the second network routing domain. In some aspects, the first network routing domain is rooted at a first border node between a local backhaul network including the network node and a main backhaul network and the second network routing domain is rooted at a second border node between the local backhaul network and the main backhaul network.

In some aspects, the message transmitted to the control plane node is configured to indicate a reason for migrating the first flow from the first tunnel to the second tunnel to be at least one of: a link failure, a path failure, a failover, or load balancing. In some aspects, the first traffic flow is one of a plurality of traffic flows exchanged over the first tunnel. In some aspects, the determining to migrate the first traffic flow comprises selecting the first traffic flow from the plurality of traffic flows for migrating to the second tunnel based on the first information and the second information. In some aspects, at least one of the plurality of traffic flows is maintained on the first tunnel based on the first information and the second information. In some aspects, the determining to migrate the first flow comprises selecting the second tunnel from a plurality of tunnels based on the first information and the second information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 is a flow chart of a method of migrating traffic flows according to some embodiments.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure provide for the migration of traffic flows within networks. As described in further detail below, some examples of such networks correspond to backhaul networks including Integrated-Access-Backhaul (IAB) networks.

Figure 1:
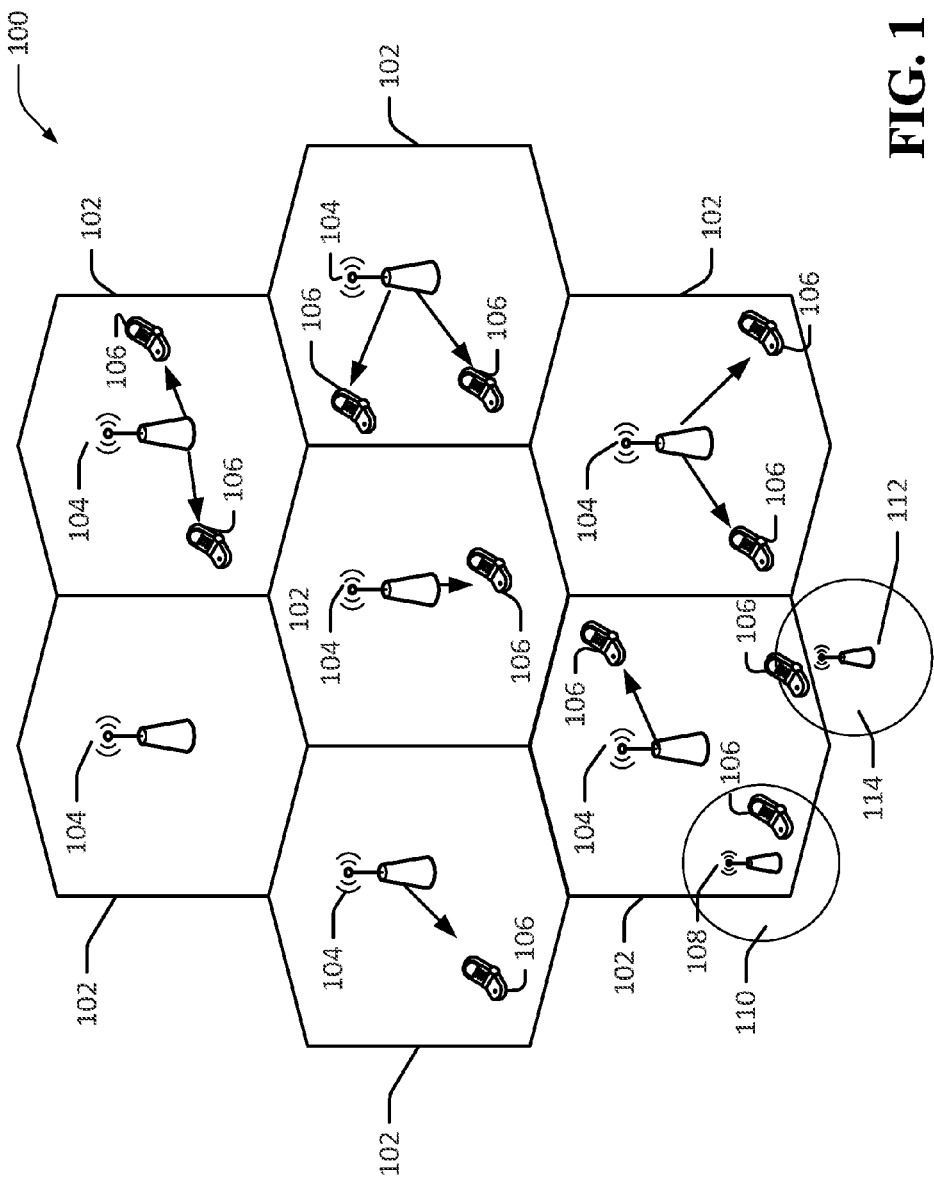
FIG. 1 is a conceptual diagram illustrating an example of an access network.

FIG. 1 is a diagram illustrating a generalized example of an access network 100 in a network architecture. In this example, the access network 100 is divided into a number of cellular regions (cells) 102, 110, 114. Each cellular region 102, 110, 114 includes a base station (BS) 104, 108, 112. One or more lower-power class BSs 108, 112 may have cellular regions 110, 114, respectively, that overlap with one or more other cellular regions (cells) 102. The cellular regions 110, 114 served by the lower power class BSs 108, 112 may be, for example, femto cells, pico cells, or micro cells.

Broadly, each base station (BS) 104, 108, 112 may be an evolved Node B (eNB), home eNB, access point or a user equipment (UE) 106 in a device-to-device and/or mesh network. One or more of the BSs 104, 108, 112 may also be referred to by those skilled in the art as a base station, a base transceiver station, a radio base station, a radio transceiver, a transceiver function, a basic service set (BSS), an extended service set (ESS), or some other suitable terminology. The BSs 104, 108, 112 provide access points to the network for one or more UEs 106. Examples of UEs 106 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 106 may also be referred to by those skilled in the art as a mobile node, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the BSs 104, 108, 112 manage the resources on the carrier and assign resources to other users of the channel, such as one or more UEs 106 in the cellular network 100. In addition, the BSs 104, 108, 112 may be responsible for all radio related functions including radio bearer control, admission control, mobility control, scheduling, security, and connectivity to a centralized controller and/or gateway within a remote network, such as a mobile core network.

The modulation and multiple access scheme employed by the access network 100 may vary depending on the particular telecommunications standard being deployed. In Long Term Evolution (LTE) applications, OFDM is used on the downlink (DL) and SC-FDMA is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

In some aspects of the disclosure, the access network 100 may overlap with a backhaul network, such as an Integrated-Access-Backhaul (IAB) network. That is, some or all of the BSs 104, 108, 112 may be IAB nodes 200 (see FIGS. 2-8) and may accordingly communicate with one another over the IAB network.

Figure 2:
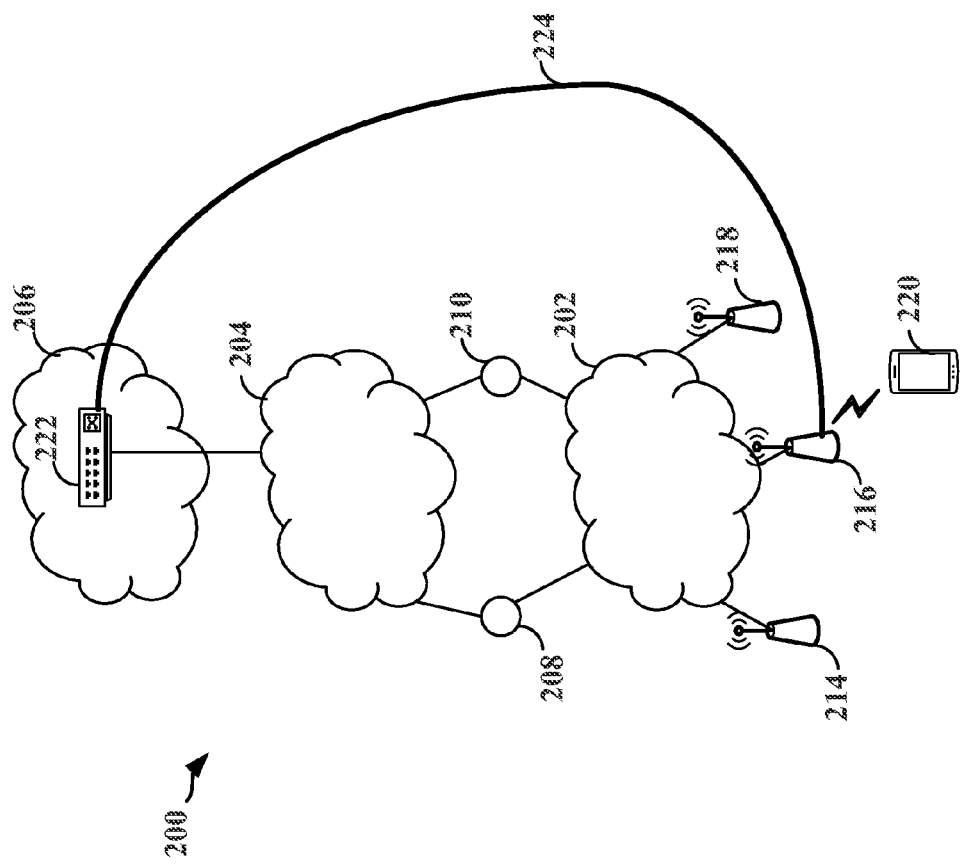
FIG. 2 is a schematic diagram providing a high-level illustration of one example of a network configuration according to some embodiments.

FIG. 2 is a schematic diagram providing a high-level illustration of one example of a network configuration that may be utilized in some aspects of the disclosure. In this illustration, three networks are generally represented as clouds, including a local backhaul network 202, a main backhaul network 204, and a remote network 206, such as a mobile core network (referred to herein as simply a "core network"). The representation by a cloud is intended to imply that there may be little or nothing known about the internal details of the network to the outside world, other than that one or more paths may exist between its input and output nodes.

In some examples, the main backhaul network 204 may correspond to a wireline network, such as a traditional T1 circuit switching network, a carrier Ethernet network, a hybrid of Ethernet and other Layer 2 technologies, such as Asynchronous Transfer Mode (ATM), T1-E1 and Frame Relay, an Internet Protocol (IP)/Ethernet network, or a flat Internet Protocol (IP) network. In addition, as described further below, the local backhaul network 202 may correspond to an IAB network. In such an IAB network, the wireless spectrum may be used for both access links and backhaul links.

In some examples, the local backhaul network 202 and the main backhaul network 204 are both Internet Protocol (IP) networks. In other examples, the local backhaul network 202 is an IP network, while the main backhaul network 204 is another type of network. Each backhaul network 202 and 204 typically supports a respective networking protocol, such as IP or IEEE 802.1 on the forwarding plane, and may also support a respective routing protocol on the control plane.

In the example shown in FIG. 2, the local and main backhaul networks 202 and 204 are interconnected by a plurality of border nodes, including border node 208 and border node 210 as illustrated. These border nodes 208 and 210 generally provide network connectivity between the core network 206 and the local backhaul network 202 via the main backhaul network 204. Furthermore, the local backhaul network 202 is illustrated as supporting a plurality of access points or base stations (BS) 214, 216, 218, which may each have wireless links with one or more user equipment (UE) 220.

Broadly, a base station 214, 216, 218 may function to support and provide wireless access to the UEs 220, to create tunnels (e.g., tunnel 224) via the local backhaul network 202 and the main backhaul network 204 to the core network 206, and to effectively to communicate all traffic flows containing access traffic between the UEs 220 and the core network 206 by relaying the traffic flows between respective wireless access links or air interfaces between the UE 220 and the BSs 214, 216, 218 and the respective tunnels 224. In some examples, more than one tunnel 224 may be allocated to each UE 220.

The endpoints of the tunnel 224 include a local anchor residing on the BS 216 and a global anchor residing on a control plane node 222 in the core network 206. Various protocols may be used to create and manage the tunnels 224. By way of example, but not limitation, protocols such as Mobile IPv4, Mobile IPv6, Proxy Mobile IP, 3GPP W-CDMA and/or 3GPP's System Architecture Evaluation (SAE) may be used.

In Proxy Mobile IP, for instance, a tunnel 224 may be established between a local mobility anchor, referred to as the Mobility Access Gateway (MAG) residing on the BS 216 and a global mobility anchor referred to as a Local Mobility Anchor (LMA) residing on the control plane node 222 in the core network 206. In SAE, a tunnel 224 may be established between the eNB (BS 216), which holds the local mobility anchor, and the Serving Gateway (S-GW) (control plane node 222), which represents the global mobility anchor in the core network 206. Tunnels can be realized, for example, via IP-GTP (General Packet Radio Services Tunneling Protocol)-UDP (User Datagram Protocol)-IP encapsulation, as used in SAE. In other examples, IP-GRE (Generic Routing Encapsulation)-IP, plain IP-in-IP encapsulations, IPsec (Internet Protocol Security) tunnels, or any other type of tunnel that uses layering via packet encapsulation and de-capsulation may be used.

Figure 3:
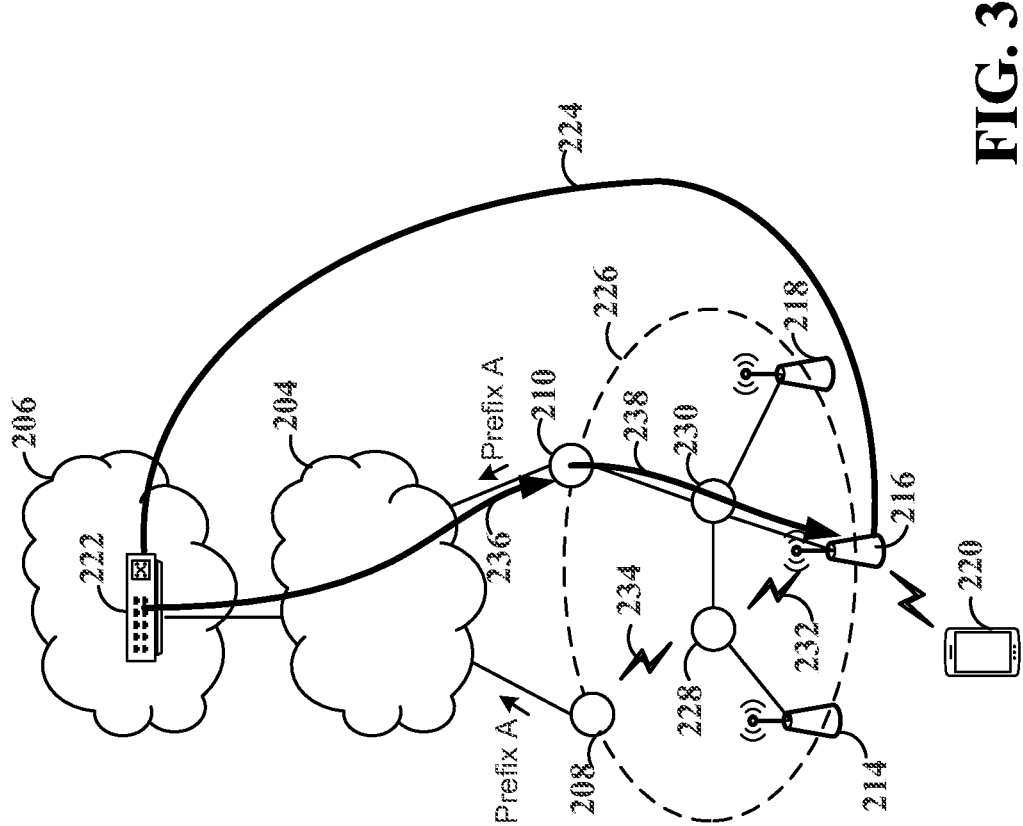
FIG. 3 is a schematic diagram illustrating additional details of the network configuration of FIG. 2 including an Integrated-Access-Backhaul (IAB) network.

FIG. 3 illustrates additional details of one example of the local backhaul network 202 of FIG. 2. In the example illustrated in FIG. 3, the local backhaul network 202 may be an Integrated-Access-Backhaul (IAB) network 226. However, this is merely one example, and aspects of the disclosure may be applied to other types of local backhaul networks, and not limited to IAB networks.

The IAB network 226 includes a plurality of IAB nodes 214, 216, 218, 228 and 230, which may be access points, base stations (BS), eNBs, or other nodes that utilize wireless spectrum (e.g., the radio frequency (RF) spectrum) to support access for UEs and for the backhauling of access traffic. This may be referred to as wireless self-backhauling. Such wireless self-backhauling can enable fast and easy deployment of highly dense small cell networks. That is, rather than requiring each new BS deployment to be outfitted with its own hard-wired backhaul connection, the wireless spectrum utilized for communication between the BS and UE may be leveraged for backhaul communication between any numbers of IAB nodes, to form the IAB network 226.

For example, as shown in FIG. 3, access traffic may be backhauled between IAB node 216 and IAB node 228 via wireless backhaul link 232 and between IAB node 228 and border node 208 via wireless backhaul link 234. Some or all of the IAB nodes 214, 216, 218, 228, and 230 may also be connected via wired backhaul links (e.g., fiber, coaxial cable, Ethernet, copper wires, etc.) and/or microwave backhaul links. Thus, the IAB network 226 may support both wired/microwave and wireless backhaul traffic. In one example, the physical air interfaces between respective IAB nodes (e.g., IAB nodes 216 and 228) and between the IAB node 216 and the UE 220 may be IEEE 802.11 air interfaces.

The border nodes 208 and 210 illustrated in FIG. 3 may also be IAB nodes. However, unlike other IAB nodes in the IAB network 226, border nodes 208 and 210 also may provide a communication link to the main backhaul network 204. For example, a border node 208, 210 may include a wired (e.g., fiber, coaxial cable, Ethernet, copper wires), microwave, or other suitable backhaul link to the main backhaul network 204.

In general, in the example illustrated in FIG. 3, each IAB node in the IAB backhaul network 226 may represent a BS, which may provide an air interface for wireless access to one or more UEs 220. Some of the IAB nodes may correspond to macrocell base stations, some may correspond to microcells or picocells, while others may correspond to femtocells or other small-range, low-power cells.

In one exemplary implementation, border node 208 and border node 210 may correspond to macrocell base stations, while other BSs (i.e., IAB nodes 214, 216, 218, 228, and 230) in the IAB network 226 may correspond to small cells or low-power cells deployed to extend the network beyond what would otherwise be available from the border nodes alone. In this way, a network operator may build out their access network in a relatively low-cost and straightforward manner, creating a mesh topology (or otherwise configured network) out of a set of low-power IAB nodes, which may each further operate to backhaul access traffic. These small cells or low-power cells generally have a small footprint, and while each small cell may be capable of providing a high capacity, it may only serve a small number of UEs at any given time. Thus, excess capacity may be utilized to self-backhaul the access traffic through the IAB backhaul network to a border node 208 or 210. In some examples, the IAB network 226 may be an IEEE 802.11x mesh network.

Access traffic communicated between a given UE, such as the illustrated UE 220, and the core network 206 may thus utilize the IAB network 226 in coordination with the main backhaul network 204 for communication with the core network 206 through the tunnel 224. At the physical layer, the access traffic from the UE 220 to the IAB node 216 via the wireless access link may be relayed or forwarded by way of a backhaul link (wired or wireless) to a neighbor IAB node 230, which may forward it to yet another IAB node (not illustrated), with this continuing any number of times until the information traffic reaches a border node, such as the border node 210 in FIG. 3. The border node 210 forwards the traffic flow containing the access traffic to the control plane node 222 in the core network 206 via the main backhaul network 204. In the other direction, at the physical layer, the access traffic may take a suitable path from the core network 206 through the main backhaul network 204 to the border node 210, and then may traverse any number of IAB nodes, including IAB node 230, in the IAB network 226 to arrive at the UE's local anchor (IAB node 216), which is the serving BS for the UE 220.

The physical path that the access traffic traverses between the IAB node 216 and the control plane node 222 is referred to herein as the routing path. In the illustrated example of FIG. 3, all access traffic between the UE 220 and the core network 206 is routed through the border node 210. Thus, access traffic from the core network 206 toward the UE 220 takes routing path 236 through the main backhaul network 204. The remainder of the path through the IAB network 226 is shown as routing path 238. Of course, the illustrated routing paths 236/238 represent only one possible path the access traffic might take, and the access traffic might traverse any border node in the IAB network 226.

The IAB network 226 may be addressed by a network address prefix (e.g., Prefix A), which it advertises to the main backhaul network 204. To route packets to/from the UE 220, the IAB node 216 utilizes a tunnel endpoint address, which includes the network address prefix. For example, the tunnel endpoint address for the UE 220 may be "A6." Downstream packets for the UE 220 would then carry "A6" as the destination address in the packet header when traveling via the tunnel 224 through the main backhaul network 204 and the IAB network 226. Upon receiving the downstream packets, the IAB 216 may remove the tunnel header and deliver the packets to the UE 220 over the wireless link.

Although multiple border nodes 208 and 210 are shown having respective connections to the main backhaul network 206, which provides a level of redundancy in the IAB network 226, a problem arises when the IAB network 226 is not able to exploit the link redundancy it sustains with the main backhaul network 226. For example, if the IAB network 226 is not able to convey sufficiently refined routing information to the main backhaul network 204, such as host routes or load-related information, access traffic may not be able to be re-routed between border nodes 208, 210.

Restrictions on transferring routing information between the IAB network 216 and main backhaul network 204 may be the result of various factors. For example, both networks 204 and 226 may be owned by different network operators that do not want to share refined network topology or performance information with each other. As another example, the routing protocol used within the main backhaul network 204 may be unknown or may not support load-related information. It may also be possible that the main backhaul network 204 is statically configured, and therefore, does not support any routing protocol. One or both of the backhaul networks 204 and 226 may also desire to isolate their network from the topology and load dynamics of the other. For example, the main backhaul network 204 may need to be isolated from high-rate routing updates from the IAB network 226 due to changes on the wireless links in the IAB network 226.

In any of the above scenarios, the main backhaul network 204 may select one of the border nodes (e.g., border node 210) as the entry/exit point for all access traffic between the core network 206 and the IAB network 226. In the illustrated example of FIG. 3, if routing path 236 is used for all access traffic from the core network 206 to the IAB network 226, then routing path 238 may effectively be the only routing path available for the access traffic to arrive at the UE 220. Such a configuration makes the IAB network 226 more vulnerable to local link failures or traffic congestion. For example, based on the connectivity and load conditions of the illustrated IAB nodes 210 and 230, access traffic may be not be able to be delivered to/from the UE 220 or may suffer from packet loss or delay, resulting in performance degradation.

For example, if a link failure occurs on routing path 238 in the IAB network 226, the only alternate routing path traverses border node 208. However, to make this switch would require the IAB network 226 to communicate a host-specific connectivity change to the main backhaul network 204, which may not be supported, as discussed above. As another option, border node 210 could stop advertising "Prefix A" to the main backhaul network. However, this would disrupt the connectivity to other IAB nodes (e.g., IAB node 218) that may only be supported via border node 210.

Figure 4:
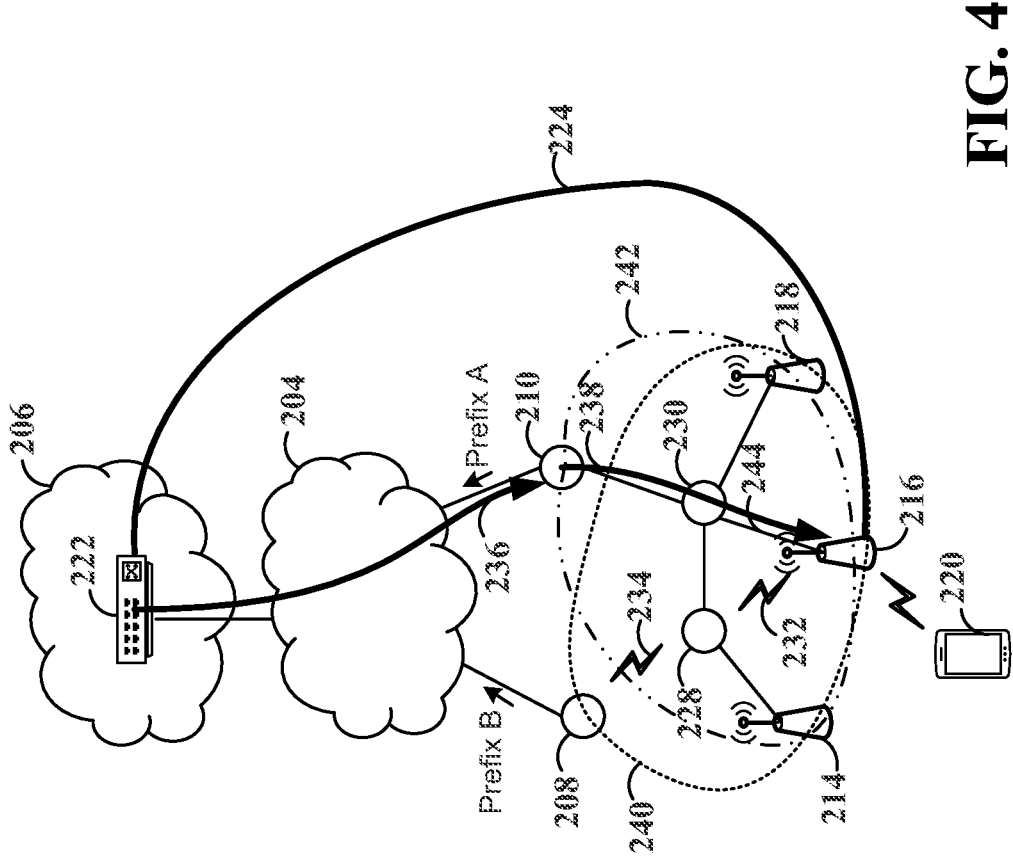
FIG. 4 is a schematic diagram illustrating a network configuration with the IAB network being configured for two overlapping network routing domains, in accordance with some embodiments.

Accordingly, one or more aspects of the present disclosure provide for a robust migration of traffic routing in cases such as link failures or traffic congestion in IAB networks. FIG. 4 illustrates a network configuration in which the IAB network is configured with two overlapping network routing domains. In the illustration of FIG. 4, the overlapping network routing domains include a first network routing domain 240 (denoted with the dashed line) and a second network routing domain 242 (denoted with the dash-dot line). Each network routing domain 240 and 242 is rooted at a different border node 208 and 210, respectively. In other examples, each network routing domain 240 may be rooted at two or more border nodes.

Each network routing domain 240 and 242 may be addressed by a different network address prefix. For example, as shown in FIG. 4, network routing domain 240 is addressed by network address prefix "A," while network routing domain 242 is addressed by network address prefix "B." Each border node 208 and 210 advertises its network address prefix to the main backhaul network 204. Consequently, IAB nodes 214, 216, 218, 228 and 230 residing in the overlap area between the network routing domains 240 and 242 obtain two tunnel endpoint addresses, one for each network routing domain 240 and 242. For example, IAB node 216 may hold tunnel endpoint address "A6" in network routing domain 242 and tunnel endpoint address "B3" in network routing domain 240. In some examples, the tunnel endpoint addresses are IP addresses.

To separate access traffic pertaining to the two network routing domains 240 and 242, the IAB node (e.g., IAB node 216) may create a separate logical interface for each of the network routing domains 240 and 242 (as described in more detail below in connection with FIG. 8). Each logical interface may be overlaid on a respective physical interface (i.e., a network interface card) that is coupled to a respective physical link (e.g., a wireless link, a microwave link, or a wired link, such as fiber, coaxial cable, Ethernet, copper wires and/or other wired communication link). In addition, each physical link may have one or more logical links overlaid thereon, each corresponding to one of the logical interfaces. In one example, each of the network routing domains 240 and 242 may be topologically different and independent routing networks that share physical (i.e., wireless or wired) links. As such, multiple logical links may be created and overlaid on each physical link to enable the physical links to be utilized at the logical level by more than one network routing domain. In the illustrated example of FIG. 4, some of the physical links, such as physical link 244, are overlaid with two logical links, to implement the two network routing domains 240 and 242.

In an example, the IAB nodes 208, 210, 214, 216, 218, 228, 230 may use local area network (LAN)-based forwarding on the backhaul and virtual local area network (VLAN) tags for differentiation of the network routing domains 240 and 242. In this manner, each physical link can support multiple logical links. In one example, each forwarding node (IAB node) represents a VLAN switch or bridge.

In another example, the IAB nodes 208, 210, 214, 216, 218, 228, 230 may use IP-based forwarding on the backhaul. In this example, VLAN tags may still be used for differentiation of the network routing domains 240 and 242 and the logical links on top of each physical links. In one example, each forwarding node (IAB node) may represent an IP router.

With separate network routing domains 242 and 244, the link failure problem scenario described above may be addressed. In normal operation, as shown in FIG. 4, the global anchor, or control plane node 222, in the core network 206 may forward access traffic directed to the UE 220 along routing path 236, to network routing domain 242 rooted at border node 210. Border node 210 may accordingly forward this traffic along routing path 238 towards the UE 220.

Figure 5:
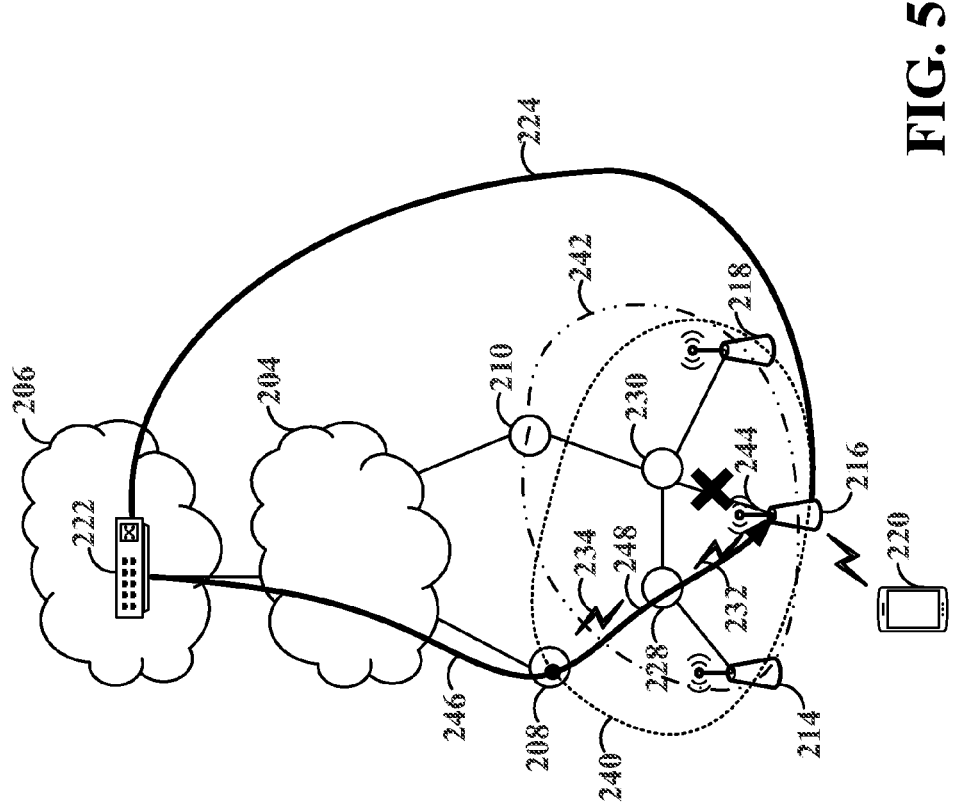
FIG. 5 is a schematic diagram illustrating migrating of traffic flows from one network routing domain to another in an IAB network according to some embodiments, in accordance with some embodiments.

However, with reference now to FIG. 5, if a link failure occurs along routing path 238 (e.g., at link 244), the traffic delivered to border node 210 is not available to be delivered to the local anchor, or IAB node 216, serving the UE 220. Such a link failure may occur for a number of reasons. For example, if the link 244 is a wireless link, an obstruction or source of interference may cause the wireless link to fail. As a result of failure of the link 244, the serving IAB node 216 no longer has any connectivity to the border node 210.

Since IAB node 216 is located within an overlap region between the two network routing domains 240 and 242, upon failure of link 244, the traffic flow within tunnel 224 between the local anchor (IAB node 216) and the global anchor (control plane node 222) may be migrated from network routing domain 242 to network routing domain 240. Traffic flow migration may be realized by either re-assigning a traffic flow to a new tunnel with different endpoints or by migrating the same tunnel to different tunnel endpoints. For ease of understanding, migrating a traffic flow from a first tunnel to a second tunnel is considered to encompass either type of traffic flow migration.

In the illustrated example in FIG. 5, the traffic flow may be migrated by re-directing the access traffic through border node 208. Thus, access traffic from the core network 206 towards the UE 220 may be switched to routing path 246 through the main backhaul network 204 and towards border node 208. Border node 208 may then route the access traffic to the serving IAB node 216 through the IAB network over routing path 248.

To facilitate the traffic flow migration, as described above, the local anchor (IAB node 216) is provisioned with two network addresses (also referred to herein as tunnel endpoint addresses): one corresponding to the first network routing domain 240, and one corresponding to the second network routing domain 242. For example, IAB node 216 may hold tunnel endpoint address "A6" in network routing domain 242 and tunnel endpoint address "B3" in network routing domain 240.

To initiate migration of the access traffic, IAB node 216 may send a path update message to the control plane node 222 in the core network 206 via network routing domain 240, and request the control plane node 206 to switch the flow of the access traffic from the current tunnel corresponding to tunnel endpoint address A6 to a new tunnel corresponding to tunnel endpoint address B3. Since tunnel endpoint address B3 belongs to the first network routing domain 240, which includes border node 208, all access traffic may then be routed from the main backhaul network 204 to border node 208. In this way, the UE 220 may be unaware of the tunnel migration, and may continue communicating with the core network 206, while the local anchor (IAB node 216) leverages the use of multiple network routing domains and IP addresses to migrate the tunnel 224 and avoid the link failure in the IAB network.

In one example, if the tunnel 224 is managed using Proxy Mobile IP, to migrate the traffic flow from network routing domain 242 to network routing domain 240, the MAG residing on the IAB node 216 may send a binding update message to the LMA residing on the control plane node 222. The binding update message may include, for example, the flow identifier (ID) and the new IP address (e.g., address A6) to be used by the MAG for this flow.

In another example, if the tunnel 224 is managed using SAE, to migrate the traffic flow from network routing domain 242 to network routing domain 240, the eNB 216 may send an S1-AP path switch message to a Mobility Management Entity (MME) in the core network 206, which then sends a bearer update message to the S-GW (control plane node 222). The S1-AP path switch message may include, for example, the bearer (flow ID) and the new IP address (e.g., address A6) used by the eNB for this bearer.

Having created these overlapping network domains 240 and 242, each IAB node may have access to a larger set of border nodes (two or more) by way of independent IP addresses, corresponding to independent network routing domains. Each IAB node may learn about the connectivity to each border node from a respective routing protocol running on each of the network routing domains. A routing protocol specifies how network nodes (routers) disseminate information that enables them to select routes between any two nodes on a communication network. Each router generally has knowledge regarding network nodes attached directly to it. A routing protocol shares this information first among peer nodes throughout the network. This way, routers gain knowledge of the topology of the network. Routing protocols may include, for example, a distance vector protocol, a link state protocol, or other routing protocol.

Thus, an IAB node, such as IAB node 216 may learn the status of a first route to border node 208 using a first routing protocol running on the first network routing domain 240, and the status of a second route to border node 210 using a second routing protocol running on network routing domain 242. With this route information, the IAB node 216 can decide which border node 208, 210 may provide better communication (e.g., throughput, bandwidth, etc.).

Figure 6:
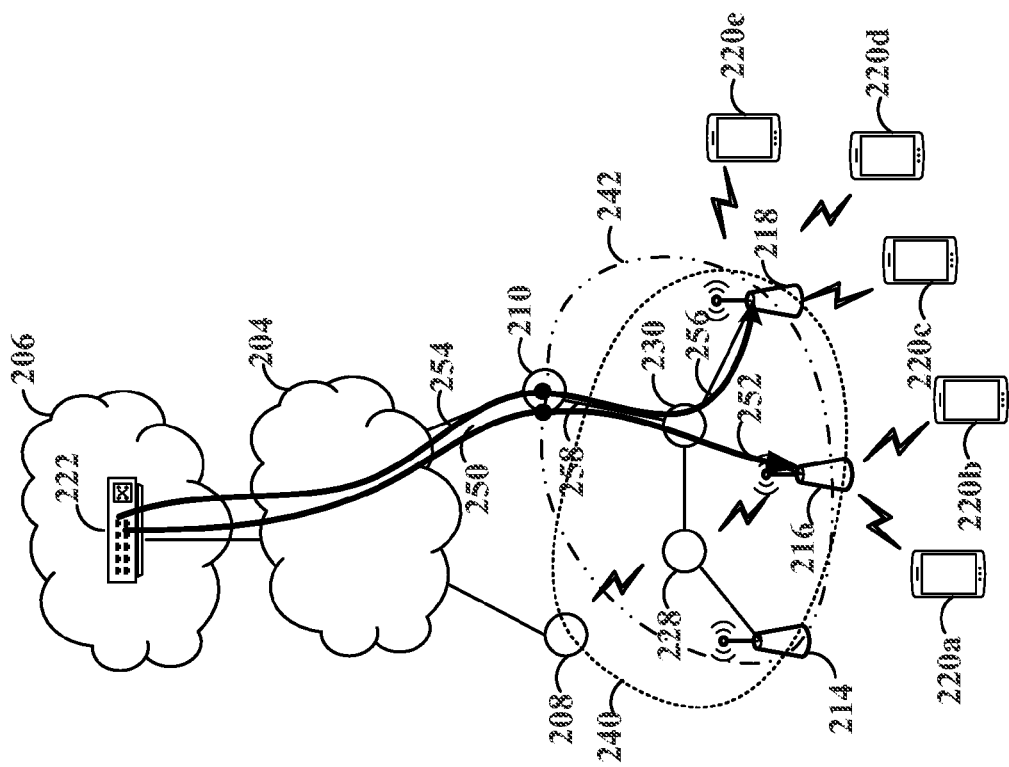
FIG. 6 is a schematic diagram illustrating unbalanced load distribution in an IAB network, in accordance with some embodiments.

FIG. 6 illustrates a scenario involving unbalanced load distribution in the IAB network that may be addressed utilizing the algorithms and procedures described above. In the illustrated example shown in FIG. 6, a relatively large number of UEs 220a-220e are accessing IAB nodes 216 and 218, which are in relatively close proximity to each other. For example, UEs 220a and 220b are accessing IAB node 216, while UEs 220c, 220d, and 220e are accessing IAB node 218.

The main backhaul network 204 may forward access traffic for all of the UEs 220a-220e via the same network routing domain 242 and corresponding border node 210. For example, access traffic from the core network 206 toward UEs 220a and 220b may take routing path 250 through the main backhaul network 204 to border node 210, and then routing path 252 through the IAB network. In addition, access traffic from the core network 206 toward UEs 220c, 220d, and 220e may take routing path 254 through the main backhaul network 204 to border node 210, and then routing path 256 through the IAB network.

In the situation illustrated in FIG. 6, due to the high volume of traffic on network routing domain 242, border node 210 may experience a local traffic overload condition (e.g., where an amount of traffic communication on a physical link exceeds a threshold). In the illustrated example, since the backhaul link 258 from border node 210 to neighboring IAB node 230 is carrying access traffic on both routing path 252 and routing path 256, the backhaul link 258 may become overloaded, causing throughput to suffer on downstream nodes. The backhaul link 258 may be a wired physical link, as illustrated, or a wireless physical link. Overloading conditions may be more likely to occur when using wireless backhaul physical links since wireless link capacity cannot easily be increased due to the limited availability of the spectrum.

Figure 7:
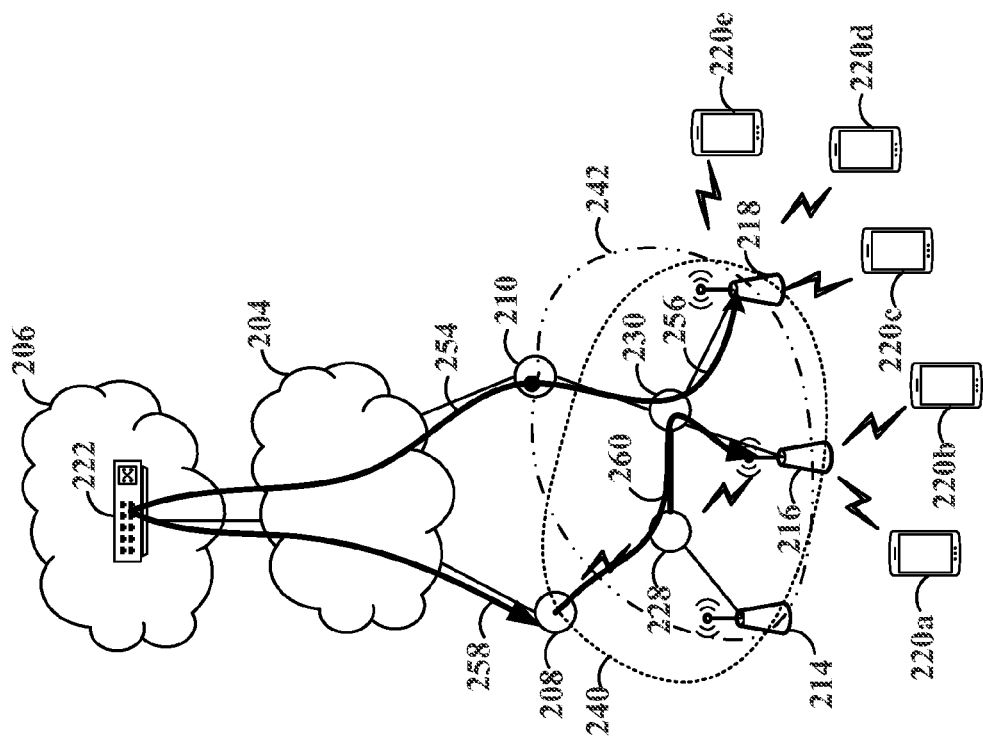
FIG. 7 is a schematic diagram illustrating load balancing in an IAB network, in accordance with some embodiments.

Therefore, in accordance with an aspect of the present disclosure, load balancing may be utilized to reduce local traffic overload conditions within a network, such as an IAB network. As illustrated in FIG. 7, since IAB nodes 216 and 218 are located within the overlap region between the two network routing domains 240 and 242, each IAB node 216 and 218 is provisioned with two tunnel endpoint addresses, one corresponding to the first network routing domain 240 and one corresponding to the second network routing domain 242. For example, IAB node 216 may hold tunnel endpoint address "A6" in network routing domain 242 and tunnel endpoint address "B3" in network routing domain 240. Likewise, IAB node 218 may hold tunnel endpoint address "A5" in network routing domain 242 and tunnel endpoint address "B8" in network routing domain 240.

Upon determining that an overload condition exists at border node 210, one or more of the IAB nodes, such as IAB node 216, may select one or more traffic flows (each associated with one of the UEs 220a and 220b) to migrate from network routing domain 242 to network routing domain 240. In the illustrated example in FIG. 7, IAB node 216 may migrate the traffic flows involving UEs 220a and 220b by re-directing access traffic through border node 208. Thus, access traffic from the core network 206 towards UEs 220a and 220b may be switched to routing path 258 through the main backhaul network 204 and towards border node 208. Border node 208 may then route the access traffic to the serving IAB node 216 through the IAB network over routing path 260.

To initiate migration of the access traffic, IAB node 216 may send a path update message to the control plane node 222 in the core network 206 via network routing domain 240 (or network routing domain 242), and request the control plane node 206 to switch the flow of the access traffic from the current tunnel corresponding to tunnel endpoint address A6 to a new tunnel corresponding to tunnel endpoint address B3. Since tunnel endpoint address B3 belongs to the first network routing domain 240, which includes border node 208, all access traffic may then be routed from the main backhaul network 204 to border node 208. In this way, the UEs 220a and 220b may be unaware of the tunnel migration, and may continue communicating with the core network 206, while the local anchor (IAB node 216) leverages the use of multiple network routing domains and IP addresses to migrate the tunnels, relieving some of the congestion that might otherwise occur in transmissions from border node 210.

In one example, each IAB node 216 and 218 may receive routing messages from the two routing protocols that it supports (corresponding to the two network routing domains 240 and 242). From the routing messages, each IAB node 216 and 218 may derive link information and route information and use the link and route information to determine whether one or more traffic flows serviced by the IAB node should be migrated from a current network routing domain to another network routing domain. The link information may include, for example, one or more link metrics. A link metric includes information related to the physical link quality, such as signal strength, signal-to-noise ratio (SNR) or signal interference to noise ratio (SINR) measurements, noise rise, interference, path loss, throughput estimate, load estimate, and/or latency estimate. Link metrics may be derived from beacons, pilot signals or discovery signals received from peer IAB nodes.

The route information may include, for example, one or more route metrics. A route metric may convey information related to a set of link metrics, where the links pertain to a particular route within a network routing domain of the IAB network. For example, a set of link metrics may be used to derive aggregate information related to the route and form a route metric. A route metric may also convey aggregate information related to the route, such as hop count, the minimum throughput value along the route, aggregate route latency and/or a bottleneck load value along the route. Route metrics may be provided or derived from route updates delivered, for example, via a distance vector protocol, a link state protocol, or other routing protocol. The route metrics may further relate to a route to an adjacent network, to a remote network, such as the core network 206, or to a default route.

In one embodiment, the routing protocol allows an IAB node, such as IAB node 216, to derive a cost metric to a neighbor network via the network routing domain supporting the routing protocol. The cost metric may provide a grade, which can capture load, throughput, etc. within its characterization. Consequently, IAB node 216 obtains a cost (cost_A) to a neighbor network, such as the main backhaul network 204, via network routing domain 240 and another cost (cost_B) to the same neighbor network via network routing domain 242. The cost metrics may correspond to the hop count or to the sum of the inverse of the link capacities along the path to the neighbor network, where the link capacity may refer to the nominal capacity of a link or the actual capacity discounting the present link load.

IAB node 216 may select a network routing domain for all or a set of traffic flows based on the respective cost metrics of each network routing domain. For example, IAB node 216 may select network routing domain 240 (referred to below as network A) over network routing domain 242 (referred to below as network B) for all traffic flows when cost_A<cost_B. In the case where network A has been selected, IAB node 216 may then modify the selection criteria by adding a hysteresis parameter H1, e.g. if cost_A+H1<cost_B. The hysteresis parameter reduces ping-pong between both network routing domains. Such an algorithm may also apply to link failures, as shown in FIG. 5.

As another example, IAB node 216 may also select only a fraction of access traffic to be migrated from network A to network B. Such a gradual selection supports load balancing in the IAB network. For this purpose, cost_A and cost_B may include the actual traffic load across the network routing domains. Further, one or more thresholds T may be used to apply a gradual migration algorithm. Following provides an example of a gradual migration algorithm.

If cost_A−cost_B>T1, migrate X amount of traffic from network A to network B.

If cost_B−cost_A>T2 migrate X amount of traffic from network B to network A.

Here, the thresholds T1/T2 represents other hysteresis values which have the goal to avoid ping-pong, and X may refer to a small amount of access traffic, which can be measured in number of UEs or number of traffic flows, for instance. Such a migration algorithm may further be run periodically to ensure that larger imbalances can be gradually reduced.

Routing messages may in some examples be exchanged relatively frequently, e.g., every few seconds. For example, based on the factors or parameters provided for a given link, each IAB node may provide routing messages relating to their congestion at that time. In other examples, the transmission of routing messages may be event-driven. For example, a link failure of a downstream link may result in the transmission of a routing message to upstream IAB nodes. As such, each IAB node may learn the quality of a given route/link and may make their selection of a network routing domain accordingly.

Figure 8:
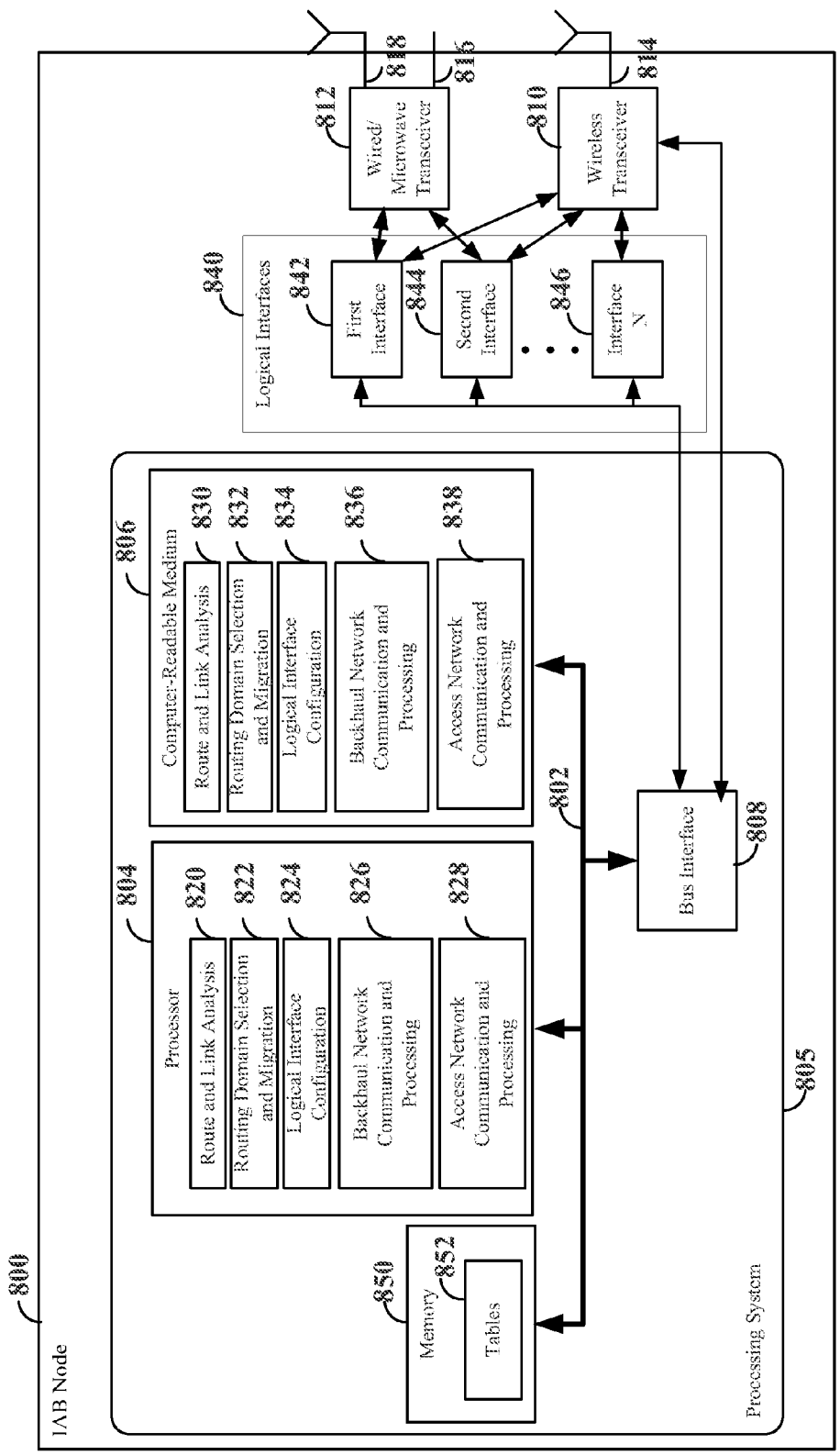
FIG. 8 is a block diagram conceptually illustrating an example of an IAB node according to some embodiments.

FIG. 8 is a conceptual diagram illustrating an example of a hardware implementation for an IAB node 800 employing a processing system 805. In accordance with various aspects of the disclosure, an element, or any portion of an element, or any combination of elements may be implemented with a processing system 805 that includes one or more processors 804.

In various aspects of the disclosure, the IAB node 800 may correspond to a base station in a wireless communication network, such as an IAB network, having a wireless transceiver 810 configured for communicating with one or more user equipment (UE) or other entities in the wireless communication network. Here, the wireless transceiver 810 may further be configured for wireless communication with one or more other base stations or IAB nodes over a wireless backhaul network. In some examples, the wireless transceiver 810 may include circuitry for transmitting and receiving via more than wireless communication protocol, such as circuitry for communicating according to two or more of Long Term Evolution (LTE) (in FDD, TDD, or both modes), LTE-Advanced (LTE-A) (in FDD, TDD, or both modes), CDMA2000, Evolution-Data Optimized (EV-DO), IEEE 802.11 (Wi-Fi), IEEE 802.16 (WiMAX), IEEE 802.20, Bluetooth, and/or other suitable wireless communication protocol. In a further aspect, the IAB node 800 may optionally include a wired and/or microwave transceiver 812 for communication with one or more other base stations or IAB nodes or a main backhaul network. For example, the IAB node 800 may correspond to a border node.

Each transceiver 810 and 812 provides a means for communicating with various other apparatus over a respective transmission medium or physical link. For example, the wireless transceiver 810 may be coupled to one or more antennas (generally represented by antenna 814) to provide communication over a wireless communication link with one or more UEs or base stations. The wired/microwave transceiver 814 may be coupled to one or more wired links (represented generally by link 816) to provide wired communication with one or more base stations or the main backhaul network. Examples of wired links include, but are not limited to, fiber, coaxial cable, Ethernet, copper wires and/or other wired communication link. The wired/microwave transceiver 814 may also be coupled to one or more microwave antennas (represented generally by antenna 818) to provide communication over a wireless microwave link with one or more base stations or the main backhaul network.

Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in an IAB node 800, may be used to implement any one or more of the processes described below.

In this example, the processing system 805 may be implemented with a bus architecture, represented generally by the bus 802. The bus 802 may include any number of interconnecting buses and bridges depending on the specific application of the processing system 805 and the overall design constraints. The bus 802 links together various circuits including one or more processors (represented generally by the processor 804), a memory 850, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and the transceivers 810 and 812.

The processor 804 is responsible for managing the bus 802 and general processing, including the execution of software stored on the computer-readable medium 806. The software, when executed by the processor 804, causes the processing system 805 to perform the various functions described below. The computer-readable medium 806 may also be used for storing data that is manipulated by the processor 804 when executing software.

In some aspects of the disclosure, the processor 804 may include route and link analysis circuitry 820, configured to receive periodic and/or event-driven routing messages related to one or more routes and/or links. The routing messages may include, for example, link state messages and/or distance-vector messages received on one or more physical interfaces. The routing messages may also include other types of routing protocol messages received on one or more logical interfaces. From the routing messages, the route and link analysis circuitry 820 may derive or determine link information pertaining to each physical link coupled to the IAB node and route information pertaining to one or more routes to/from the IAB node within the IAB network. The routes may each have a common destination network, such as the core network or the main backhaul network. Each route may also have a different destination node, such as a border node of a particular network routing domain. The routes may also refer to default routes provided by each network routing domain.

The link information may include, for example, one or more link metrics. Examples of link metrics include, but are not limited to, signal strength, signal-to-noise ratio (SNR) or signal interference to noise ratio (SINR) measurements, noise rise, interference, path loss, throughput estimate, load estimate, and/or latency estimate. The route information may include, for example, one or more route metrics. Examples of route metrics include, but are not limited to, the hop count, the minimum throughput value along the route, aggregate route latency, a bottleneck load value along the route, and/or other aggregated link metrics. The route and link analysis circuitry 820 may operate in coordination with route and link analysis software 830.

The processor 804 may further include routing domain selection and migration circuitry 822, configured to select a network routing domain for one or more traffic flows based on the route and link information derived by the route and link analysis circuitry 820. In various aspects of the disclosure, the selection of traffic flows for migration may be based on a comparison between the route/link information for the different routing domains. For example, if the route/link information indicates that a link failure has occurred on a link within a first network routing domain, the routing domain selection and migration circuitry 822 may select a second network routing domain for all traffic flows on the first network routing domain and migrate those traffic flows from the first network routing domain to the second network routing domain. As another example, if the route/link information indicates that an unbalanced load condition exists between the network routing domains, the routing domain selection and migration circuitry may select one or more traffic flows on one of the network routing domains to migrate to another network routing domain.

The routing domain selection and migration circuitry 822 may further generate and transmit a path update message to a control plane node in the core network via one of the network routing domains to request the control plane node to switch one or more traffic flows from a current tunnel corresponding to a current network routing domain to a different tunnel corresponding to the selected network routing domain. The path update message includes a respective identifier of each flow to be migrated and the new tunnel endpoint address (IP address) used by the IAB node 800 for the selected traffic flows. The routing domain selection and migration circuitry 822 may further operate in coordination with routing domain selection and migration software 832.

The processor 804 may further include logical interface configuration circuitry 824, configured to provide a separate logical interface 840 for each network routing domain. For example, a first logical interface 842 may be created for a first network routing domain, a second logical interface 844 may be created for a second network routing domain, and so on until the $N^{th}$ logical interface 846 is created for the $N^{th}$ network routing domain. The logical interface configuration circuitry 824 may be manually configured to provide (create) the logical interfaces 840 or may automatically/dynamically provide (create) the logical interfaces 840

Each logical interface 840 is virtually overlaid on a respective physical interface (i.e., network interface card) coupled to a respective physical link to enable each physical link to be utilized at the logical layer by more than one network routing domain. For example, the first logical interface 842 created for the first network routing domain may be overlaid on a wireless interface so that all traffic flows pertaining to the first network routing domain are forwarded to the wireless transceiver 810 for transmission over the wireless communication link. In another example, the second logical interface 844 created for the second network routing domain may be overlaid on a wired/microwave interface so that all traffic flows pertaining to the second network routing domain are forwarded to the wired/microwave transceiver 812 for transmission over a wired link 816. In yet another example, the $N^{th}$ logical interface 846 created for the $N^{th}$ network routing domain may also be overlaid on the wireless interface so that all traffic flows pertaining to the $N^{th}$ network routing domain are forwarded to the wireless transceiver 810 for transmission over the wireless communication link.

The logical interface configuration circuitry 824 further assigns a network (or tunnel endpoint) address, such as an IP address, to each logical interface 840. The tunnel endpoint address includes the network address prefix for the network routing domain associated with the logical interface 840. In addition, the logical interface configuration circuitry may further map each tunnel for each traffic flow to one of the logical interfaces 840, as determined by the routing domain selection and migration circuitry 822. The mapping of network routing domains to logical interfaces 840 may be maintained in one or more tables 852 within, for example, memory 850. The tables 852 may further map each logical interface 850 to a respective physical links (physical interfaces), a respective network (tunnel endpoint) address and one or more traffic flow tunnels. Thus, the logical interface configuration circuitry 824 may operate in connection with the routing domain selection and migration circuitry 822 to populate the tables 852 with the correct mapping between tunnels (and associated tunnel endpoint addresses) and network routing domain/logical interfaces 840.

Each logical interface 840 may be implemented, for example, in software. In some examples, the logical interfaces 840 are embodied in the computer-readable medium 806. In other examples, the logical interfaces 840 may reside in a computer-readable medium external to the processing system 805 or distributed across multiple computer-readable media. In various aspects of the disclosure, each logical interface 840 is represented as a software object to which IP address configuration is bound. Thus, from the perspective of the IP stack and its applications, a logical interface appears as a physical interface. However, the transmit/receive functions of the logical interface are mapped to the transmit/receive operations of the physical interface to which the logical interface is tied. The logical interface configuration circuitry 824 may statically create and configure one or more of the logical interfaces 840 or may dynamically create and configure one or more of the logical interfaces 840. The logical interface configuration circuitry may further operate in coordination with logical interface configuration software 834.

The processor 804 may further include backhaul network communication and processing circuitry 826, configured for transmitting and receiving access traffic flows to and from a backhaul network, such as an IAB network. For example, the backhaul network communication and processing circuitry 826 may configure a respective tunnel for each traffic flow, identify a respective logical interface 840 for each traffic flow (e.g., as determined by the routing domain selection and migration circuitry 822) and provide the access traffic for each traffic flow to the respective logical interface 840 for transmission via the respective tunnel through the backhaul network. The backhaul network communication and processing circuitry 826 may further receive traffic flows from the backhaul network via one or more logical interfaces 840. The backhaul network communication and processing circuitry may further operate in coordination with backhaul network communication and processing software 836.

The processor 804 may further include access network communication and processing circuitry 828, configured for transmitting and receiving access traffic flows to and from one or more UEs via wireless transceiver 810. For example, the access network communication and processing circuitry may receive access traffic from one or more UEs and provide the received access traffic to the backhaul network communication and processing circuitry 826 for forwarding of the access traffic to the core network via the backhaul network. The access network communication and processing circuitry 828 may further receive access traffic for one or more UEs from the backhaul network communication and processing circuitry 826 and transmit the access traffic to the respective UEs via the wireless transceiver 810.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 805, external to the processing system 805, or distributed across multiple entities including the processing system 805. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 9:
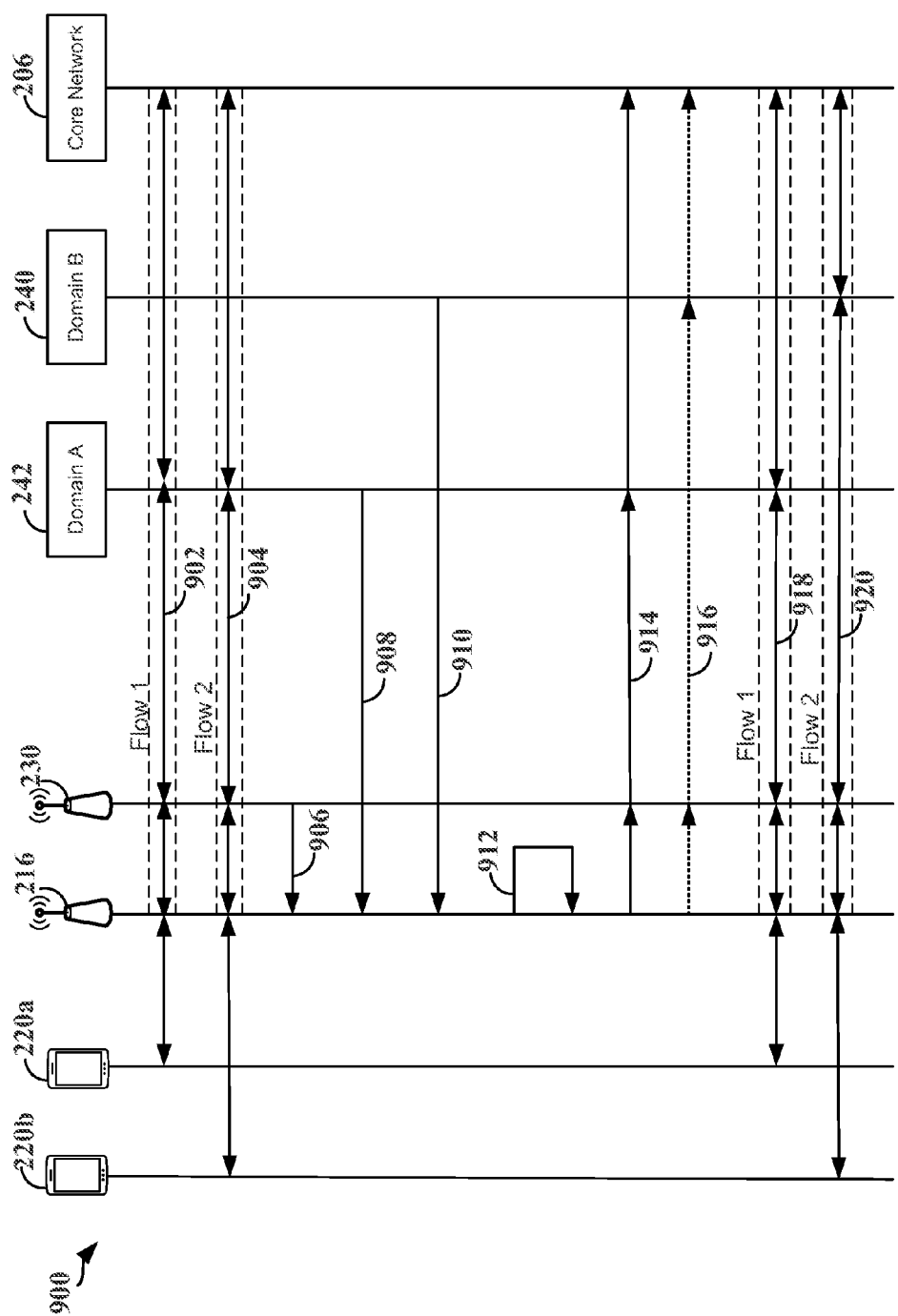
FIG. 9 is a call flow diagram illustrating a process for load balancing in an IAB network, in accordance with some embodiments.

FIG. 9 is a call flow diagram 900 illustrating one example of a process for load balancing in an IAB network. The load balancing process shown in FIG. 9 corresponds to the load balancing scenario depicted in FIG. 7. At 902, UE 220a is shown connected to IAB node 216 and exchanging access traffic with the core network 206 via Flow 1. The access traffic is tunneled between IAB node 216 and the core network 206 via Domain A 242. The IAB node 216 uses the tunnel endpoint address (IP address) it holds on Domain A 242 for the tunnel. In the illustrated example of FIG. 9, IAB node 216 sustains connectivity to Domain A 242 via a logical link on top of a physical link (wired/microwave or wireless) to IAB node 230. In this manner, all access traffic pertaining to Flow 1 is routed via Domain A 242.

At 904, UE 220b is also shown connected to IAB node 216 and exchanging traffic with the core network 206 via Flow 2. The access traffic is tunneled between IAB node 216 and the core network 206 via Domain A 242. The IAB node 216 also uses the same tunnel endpoint address (IP address) it holds on Domain A 242 for this tunnel. In the illustrated example of FIG. 9, IAB 216 further sustains connectivity to Domain A 242 via the same logical link on top of the physical link to IAB node 230. In this manner, all access traffic pertaining to Flow 2 is routed via Domain A 242.

At 906, the IAB node 216 receives a routing message (i.e., a link state message) from IAB node 230 on the physical link therebetween that allows the IAB node 216 to evaluate the link quality of the physical link. At 908, the IAB node 216 further receives a routing message (i.e., a routing protocol message) from Domain A 242 on a logical link that runs on top of the physical link between IAB node 230 and IAB node 216. In addition, at 910, the IAB node 216 receives a routing message (i.e., routing protocol message) from Domain B 240 on a logical link that runs on top of the physical link between IAB node 230 and IAB node 216. From the routing messages, the IAB node 216 can derive link information and route information related to each route between the IAB node 216 and the core network 206 (e.g., a first route via Domain A 242 and a second route via Domain B 240).

Based on the derived link and route information, at 912, the IAB node 216 selects Flow 2 to be migrated from Domain A 242 to Domain B 240. At 914, the IAB node 216 generates and transmits a path update message to the global anchor on the core network 206 to migrate Flow 2 to the tunnel endpoint address it holds on Domain B 240. The path update message may be sent via Domain A 242, as shown at 914, or via Domain B 240, as shown at 916. At 918, the access traffic for Flow 1 is maintained on the tunnel between IAB node 216 and the core network 206 via Domain A 242. However, at 920, Flow 2 has been migrated to Domain B 240, such that the access traffic for Flow 2 is exchanged on a tunnel between IAB node 216 and the core network 206.

FIG. 10 is a flow chart 1000 of a method of migrating traffic flows according to some embodiments. The method may be performed by a network node, such as an IAB node, as described above and illustrated in FIG. 8, by a processor or processing system, or by any suitable means for carrying out the described functions.

At block 1002, the IAB node provides a first interface associated with a first network routing domain. The first interface may be, for example, a first logical interface having a first network address (e.g., tunnel endpoint address) associated therewith. At block 1004, the IAB node provides a second interface associated with a second network routing domain. The second interface may be, for example, a second logical interface having a second network address (e.g., tunnel endpoint address) associated therewith.

At block 1004, a first traffic flow is communicated with a remote network, such as a core network, over a first tunnel between the IAB node and the remote network via the first interface utilizing the first network address. The first traffic flow may include, for example, access traffic communicated between the IAB node and a mobile node, such as a UE, over a wireless communication link.

At block 1006, the IAB node receives first information related to a first route between the IAB node and the remote network via the first routing domain and second information related to a second route between the IAB node and the remote network via the second routing domain. The first and second information may include, for example, one or more route metrics, such as the hop count, the minimum throughput value along the route, aggregate route latency, a bottleneck load value along the route, and/or other aggregated link metrics.

At block 1008, the IAB node determines to migrate the first traffic flow from the first tunnel to a second tunnel between the IAB node and the core network via the second interface and the second network routing domain based on the first and second information. The second tunnel utilizes the second network address. At block 1010, the IAB node transmits a message, such as a path update message, to a control plane node in the remote network to trigger migration of the first traffic flow from the first tunnel to the second tunnel, and at block 1012, the first traffic flow is communicated between the IAB node and the remote network utilizing the second tunnel.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA.

Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method operable at a network node within a wireless communication network, comprising:
   providing a first interface associated with a first network routing domain, the first interface having a first network address associated therewith, wherein the first network routing domain is rooted at a first border node between a local backhaul network and a main backhaul network;
   providing a second interface associated with a second network routing domain, the second interface having a second network address associated therewith, wherein the second network routing domain is rooted at a second border node between the local backhaul network and the main backhaul network, wherein the local backhaul network comprises a plurality of network nodes including the network node, the first border node, and the second border node;
   communicating a first traffic flow with a remote network over a first tunnel between the network node and the remote network via the first interface utilizing the first network address, wherein the first traffic flow includes access traffic communicated between the network node and a mobile node over a wireless communication link;
   determining first information relating to a first route between the network node and the remote network via the first network routing domain;
   determining second information relating to a second route between the network node and the remote network via the second network routing domain;
   determining to migrate the first traffic flow from the first tunnel to a second tunnel between the network node and the remote network via the second interface and the second network routing domain based on the first information and the second information, the second tunnel utilizing the second network address;
   transmitting a message to a control plane node in the remote network to trigger a migration of the first traffic flow from the first tunnel to the second tunnel; and
   communicating the first traffic flow with the remote network utilizing the second tunnel.

2. The method of claim 1, wherein the first interface is a first logical interface and the second interface is a second logical interface.

3. The method of claim 2, further comprising:
   determining third information about at least one physical link that supports the first and second logical interfaces, wherein the determining to migrate the first traffic flow to the second tunnel is further based on the third information.

4. The method of claim 3, wherein the third information includes link metrics related to a physical link quality of the at least one physical link.

5. The method of claim 4, wherein the first information further includes first route metrics related to a first set of link metrics pertaining to the first route and the second information further includes second route metrics related to a second set of link metrics pertaining to the second route.

6. The method of claim 5, wherein:
   the first route metrics include a first cost metric for the first route and the second route metrics include a second cost metric for the second route; and
   the determining to migrate the first traffic flow to the second tunnel comprises determining to migrate the first traffic flow from the first tunnel to the second tunnel when the second cost metric is less than the first cost metric.

7. The method of claim 2, wherein the first logical interface and the second logical interface are supported by a common physical interface.

8. The method of claim 2, wherein at least one of the first logical interface or the second logical interface is supported by a wireless interface.

9. The method of claim 1, wherein the first network address includes a first network prefix associated with the first network routing domain, and the second network address includes a second network prefix associated with the second network routing domain.

10. The method of claim 1, wherein the message transmitted to the control plane node is configured to indicate a reason for migrating the first traffic flow from the first tunnel to the second tunnel to be at least one of: a link failure, a path failure, a failover, or load balancing.

11. The method of claim 1, wherein the first traffic flow is one of a plurality of traffic flows exchanged over the first tunnel.

12. The method of claim 11, wherein the determining to migrate the first traffic flow comprises selecting the first traffic flow from the plurality of traffic flows for migrating to the second tunnel based on the first information and the second information.

13. The method of claim 11, further comprising:
maintaining at least one of the plurality of traffic flows on the first tunnel based on the first information and the second information after migration of the first traffic flow to continue communicating the at least one of the plurality of traffic flows between the network node and the remote network over the first tunnel.

14. The method of claim 1, wherein the determining to migrate the first traffic flow comprises selecting the second tunnel from a plurality of tunnels based on the first information and the second information.

15. The method of claim 1, wherein the network node comprises a base station configured as an integrated access backhaul (IAB) node and the remote network comprises a core network communicatively coupled to the local backhaul network via the main backhaul network.

16. A network node within a wireless communication network, comprising:
a wireless transceiver configured to communicate a first traffic flow with a mobile node over a wireless communication link between the network node and the mobile node;
a first interface associated with a first network routing domain and configured to communicate with a remote network via a first tunnel utilizing a first network address, wherein the first network routing domain is rooted at a first border node between a local backhaul network and a main backhaul network;
a second interface associated with a second network routing domain and configured to communicate with the remote network via a second tunnel utilizing a second network address, wherein the second network routing domain is rooted at a second border node between the local backhaul network and the main backhaul network, wherein the local backhaul network comprises a plurality of network nodes including the network node, the first border node, and the second border node; and at least one processor communicatively coupled to the wireless transceiver, the first interface and the second interface;
wherein the at least one processor is configured to:
communicate the first traffic flow with the remote network over the first tunnel;
determine first information relating to a first route between the network node and the remote network via the first network routing domain;
determine second information relating to a second route between the network node and the remote network via the second network routing domain;
determine to migrate the first traffic flow from the first tunnel to the second tunnel based on the first information and the second information;
transmit a message to a control plane node in the remote network to trigger a migration of the first traffic flow from the first tunnel to the second tunnel; and
communicate the first traffic flow with the remote network utilizing the second tunnel.

17. The network node of claim 16, wherein the first interface is a first logical interface and the second interface is a second logical interface.

18. The network node of claim 17, wherein the at least one processor is further configured to:
determine third information about at least one physical link that supports the first and second logical interfaces; and
determine to migrate the first traffic flow to the second tunnel based further on the third information.

19. The network node of claim 17, wherein the first logical interface and the second logical interface are supported by a common physical interface.

20. The network node of claim 17, wherein at least one of the first logical interface or the second logical interface is supported by a wireless interface.

21. The network node of claim 16, wherein the first network address includes a first network prefix associated with the first network routing domain, and the second network address includes a second network prefix associated with the second network routing domain.

22. The network node of claim 16, wherein the message transmitted to the control plane node is configured to indicate a reason for migrating the first traffic flow from the first tunnel to the second tunnel to be at least one of: a link failure, a path failure, a failover, or load balancing.

23. The network node of claim 16, wherein the first traffic flow is one of a plurality of traffic flows exchanged over the first tunnel, and the at least one processor is further configured to:
maintain at least one of the plurality of traffic flows on the first tunnel based on the first information and the second information after migration of the first traffic flow to continue communicating the at least one of the plurality of traffic flows between the network node and the remote network over the first tunnel.

24. A network node within a wireless communication network, comprising:
means for providing a first interface associated with a first network routing domain, the first interface having a first network address associated therewith, wherein the first network routing domain is rooted at a first border node between a local backhaul network and a main backhaul network;
means for providing a second interface associated with a second network routing domain, the second interface having a second network address associated therewith, wherein the second network routing domain is rooted at a second border node between the local backhaul network and the main backhaul network, wherein the local backhaul network comprises a plurality of network nodes including the network node, the first border node, and the second border node;

means for communicating a first traffic flow with a remote network over a first tunnel between the network node and the remote network via the first interface utilizing the first network address, wherein the first traffic flow includes access traffic communicated between the network node and a mobile node over a wireless communication link;

means for determining first information relating to a first route between the network node and the remote network via the first network routing domain;

means for determining second information relating to a second route between the network node and the remote network via the second network routing domain;

means for determining to migrate the first traffic flow from the first tunnel to a second tunnel between the network node and the remote network via the second interface and the second network routing domain based on the first information and the second information, the second tunnel utilizing the second network address;

means for transmitting a message to a control plane node in the remote network to trigger a migration of the first traffic flow from the first tunnel to the second tunnel; and means for communicating the first traffic flow with the remote network utilizing the second tunnel.

25. The network node of claim 24, wherein the first interface is a first logical interface and the second interface is a second logical interface and further comprising:

means for determining third information about at least one physical link that supports the first and second logical interfaces, wherein the means for determining to migrate the first traffic flow to the second tunnel is further based on the third information.

26. The network node of claim 24, wherein the first traffic flow is one of a plurality of traffic flows exchanged over the first tunnel, and further comprising:

means for maintaining at least one of the plurality of traffic flows on the first tunnel based on the first information and the second information after migration of the first traffic flow to continue communicating the at least one of the plurality of traffic flows between the network node and the remote network over the first tunnel.

27. A non-transitory computer-readable medium storing computer executable code, comprising code for:

providing a first interface associated with a first network routing domain on a network node, the first interface having a first network address associated therewith, wherein the first network routing domain is rooted at a first border node between a local backhaul network and a main backhaul network;

providing a second interface associated with a second network routing domain on the network node, the second interface having a second network address associated therewith wherein the second network routing domain is rooted at a second border node between the local backhaul network and the main backhaul network, wherein the local backhaul network comprises a plurality of network nodes including the network node, the first border node, and the second border node;

communicating a first traffic flow with a remote network over a first tunnel between the network node and the remote network via the first interface utilizing the first network address, wherein the first traffic flow includes access traffic communicated between the network node and a mobile node over a wireless communication link;

determining first information relating to a first route between the network node and the remote network via the first network routing domain;

determining second information relating to a second route between the network node and the remote network via the second network routing domain;

determining to migrate the first traffic flow from the first tunnel to a second tunnel between the network node and the remote network via the second interface and the second network routing domain based on the first information and the second information, the second tunnel utilizing the second network address;

transmitting a message to a control plane node in the remote network to trigger a migration of the first traffic flow from the first tunnel to the second tunnel; and communicating the first traffic flow with the remote network utilizing the second tunnel.

28. The non-transitory computer-readable medium of claim 27, wherein the first interface is a first logical interface and the second interface is a second logical interface and further comprising code for:

determining third information about at least one physical link that supports the first and second logical interfaces, wherein the determining to migrate the first traffic flow to the second tunnel is further based on the third information.

29. The non-transitory computer-readable medium of claim 27, wherein the first traffic flow is one of a plurality of traffic flows exchanged over the first tunnel, and further comprising code for:

maintaining at least one of the plurality of traffic flows on the first tunnel based on the first information and the second information after migration of the first traffic flow to continue communicating the at least one of the plurality of traffic flows between the network node and the remote network over the first tunnel.

\* \* \* \* \*